July 3, 1962 E. A. AAGAARD 3,042,816

SYMMETRICAL CURRENT CIRCUIT FED BY DIRECT CURRENT

Filed Sept. 15, 1958 2 Sheets-Sheet 1

INVENTOR
EINAR ANDREAS AAGAARD

BY
[signature]
AGENT

INVENTOR
EINAR ANDREAS AAGAARD
BY Frank R. Jeffries
AGENT

United States Patent Office
3,042,816
Patented July 3, 1962

3,042,816

SYMMETRICAL CURRENT CIRCUIT FED BY DIRECT CURRENT

Einar Andreas Aagaard, Hilversum, Netherlands, assignor to North American Philips Company, Inc., New York, N.Y., a corporation of Delaware Filed Sept. 15, 1958, Ser. No. 761,220
Claims priority, application Netherlands Sept. 14, 1957
3 Claims. (Cl. 307—89)

The invention relates to a current circuit which is fed from a direct-current source and is divided into two electrically symmetrical halves, and which is also connected to earth at one point. Such circuits serve to transfer information to other current circuits, the open or closed state of the circuit being detected by measuring the potential at a point of the circuit which is not connected to earth. Such a current circuit may be used, for example, as a subscriber's line circuit in a telephone exchange, to which use this description will be confined for convenience sake. It will be understood, however, that the current circuit according to the invention may be employed also for other purposes. The functions to be accomplished by a subscriber's line circuit are:

(*a*) The continuous or quasi-continuous supply of a signal which indicates whether, at the subscriber's set, the circuit is open or closed;

(*b*) The transfer of information other than that concerning the closed or non-closed state of the circuit in two directions (ringing signals, tone signals, speech signals).

The signal referred to under (*a*) may be the potential at a non-earthed point of the current circuit. Hereinafter this point will be called the detection point. As a matter of course, the detection point must be a point of which the potential in the open state of the circuit differs sufficiently from the potential of said point in the closed state.

The signals referred to under (*b*) may be transferred to or received by other current circuits of the exchange either inductively (by means of transformers) or capacitatively (by means of capacitors) or by a mixed process (both by means of transformers and capacitors). The invention, however, does not depend upon this process. In electronic exchanges, to which the current circuit according to the invention is particularly adapted, the transfer of information in the exchange itself takes place preferably through a single wire, which means that the second conductor required for information transfer is the earth-connected frame of the exchange. The invention is also independent of this detail.

The detection of the (open or closed) state of the subscriber's lines may be disturbed, however, particularly in an electronic exchange, by longitudinal interferences in the subscriber's lines. The subscriber's lines are to be understood to mean the two wires connecting the subscriber's set to the apparatus in the exchange. A longitudinal interference is to be understood to mean voltages and currents of equal value and direction in both wires of a given subscriber line. The longitudinal interference may be produced by an interfering voltage source, such as current- or voltage-conveying conductors that are coupled inductively or capacitatively with the two wires of the subscriber's line. For example an electric mains conductor lying close to both wires of the subscriber lines may be a source of interference. Pulse-fed counters may also produce longitudinal interferences.

A longitudinal interference in the subscriber lines is liable to change the potential at the detection point, so that a really closed subscriber lines may be indicated as open or a really open subscriber lines as closed. The invention has for its object to avoid this as yet undiscerned disadvantage. In accordance with the invention the non-earth connected point of the current circuit used for detection is connected to a detection member via a first winding of a transformer. A second circuit point, which is preferably symmetrical to the aforesaid detection point is connected to earth via a second winding of the transformer, if necessary via the voltage source. The windings are connected so that the current flowing through the second winding of the transformer owing to the longitudinal interference induces such a voltage in the first winding of the transformer that the variation brought about by the interference in the absence of this second winding in the potential applied to the detection member is substantially compensated. Two embodiments of the invention will be described more fully with reference to the drawing.

Figure 1:
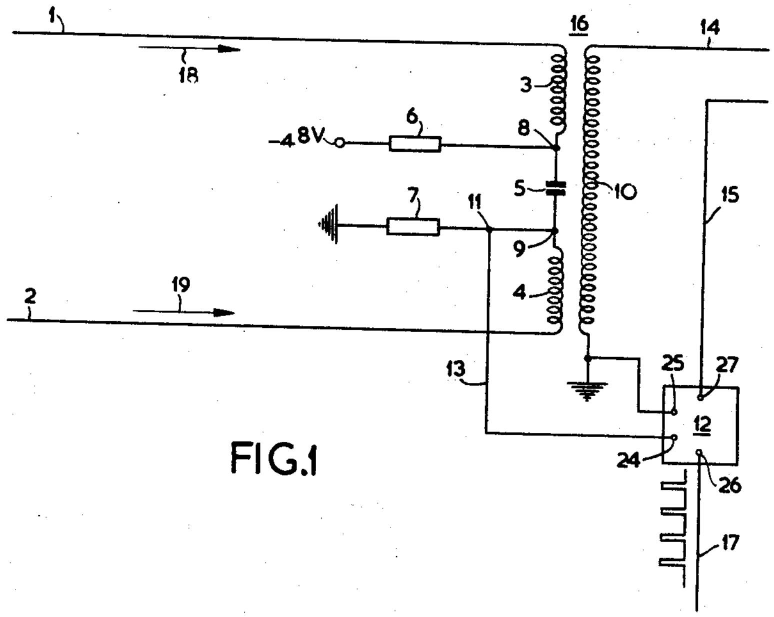
FIG. 1 shows a subscriber's circuit with inductive transmission, to which the invention is not applied.

Referring to FIG. 1, reference numerals 1 and 2 designate the two wires of a subscriber's line, 3 and 4 two identical halves of the primary winding of a transformer 16. The opposite ends 8 and 9 of these halves of the primary winding, are interconnected via capacitor 5. The capacitor 5 has such a high capacity that it has a low impedance for the ringing signal, the tone signal and the speech signal but a high impedance for possibly interference signals. The point 8 is connected via a resistor 6 to the negative terminal of a voltage source, which has a voltage of for example, 48 V and the point 9 is connected to earth via a resistor 7 of the same value as resistor 6. The positive terminal of the voltage source is connected to earth. One end of the secondary winding 10 of the transformer 16 is connected to earth and the other end to the conductor 14, which connects the subscriber's line circuit to other apparatus of the exchange (the switching network, registers and so on). The detection point is chosen to be a point 11 of the conductor, which connects the end 9 of the half 4 of the primary winding to the resistor 7. It is evident that the detection point 11 in the open state of the subscriber lines has a potential zero, but in the closed state of the subscriber circuit a negative potential. The potential at point 11 is therefore, representative of the state of the subscriber circuit.

The detection point 11 is connected via a conductor 13 to a control-terminal of a gate circuit 12. A point 25 of this gate circuit being connected to earth, it responds to a fixed potential relative to earth. The input terminal 26 of the gate circuit is connected via a conductor 17 to a square-wave signal generator and the output terminal 27 of the gate circuit 12 is connected via a conductor 15 to apparatus of the exchange. The gate circuit 12 is furthermore such that it is closed, when its control-terminal is at the potential zero, whereas it is opened when its control-terminal is at a negative potential. This gate circuit constitutes the aforesaid detection member.

If the subscriber's lines are open at the subscriber's the detection point 11 is at the potential zero and the gate circuit 12 is therefore closed. The square-wave signal does not appear across the conductor 15. If the subscriber's lines are closed at the subscriber's set, the detection point 11 is at a negative potential and hence the gate circuit 12 is open. The square-wave signal then appears across the conductor 15.

If the repetition frequency of the square-wave signal supplied to the gate circuit 12 lies sufficiently beyond the frequency region of the other information to be transmitted, the conductor 15 may be connected to the conductor 14, if desired. This conductor then transmits both information about the state (open or closed) of the subscriber circuit and the further information (ringing signal, dialing signal, tone signal, speech signal). If the speech signal lies within the frequency range from 300 to 3600 c./s., the gate circuit 12 may be connected, for example, to a square-wave signal generator having a repetition frequency of 12.5 kc./s.

The transmission of the speech signal by the transformer 16 is not substantially disturbed by longitudinal interferences in the subscriber lines. We assume, for example, that some interference produces two identical currents of the directions indicated by the arrows 18 and 19 across the subscriber lines 1 and 2. In the two halves 3 and 4 of the primary winding of the transformer 16 these currents have directions such that they produce opposite or substantially opposite magnetic fields in the core of the transformer 16 and therefore induce no or substantially no voltage in the secondary winding 10 of the transformer. This means, however, that a longitudinal interference is not transmitted to the conductor 14 or in any case transmitted only strongly attenuated.

The longitudinal interference, however, produces a variation in the potential at the detection point 11 and hence a variation in potential at the control terminal of the gate circuit 12. This may result in the subscriber lines being signalled open while in reality they are closed (which would lead to premature interruption of an existing connection) and the subscriber lines being signalled closed while in reality they are open (which would lead to unnecessary occupation of apparatus of the exchange). It should be noted here that the ringing signal or speech signal to be transmitted does not exhibit this harmful effect, when the capacity of the capacitor 5 and the resistances of the resistors 6 and 7 are chosen to be sufficiently high, since these signals then pass substantially entirely through the capacitor 5 and substantially not through the resistors 6 and 7, which then have a much higher impedance for these currents than the capacitor 5. If necessary, the resistors 6 and 7 may be replaced by inductive impedances.

A logical idea to avoid this disadvantage could reside in that the detection point is connected via a choke coil with a sufficiently high inductance to the control terminal of the gate circuit 12. However, this gives rise to a delay in the signaling of the state (open or closed) of the subscriber lines by which the dialling signal would be inadmissibly deformed. Therefore, this idea does not lead to a satisfactory solution of the aforesaid difficulties, and a different expedient must be found.

Figure 2:
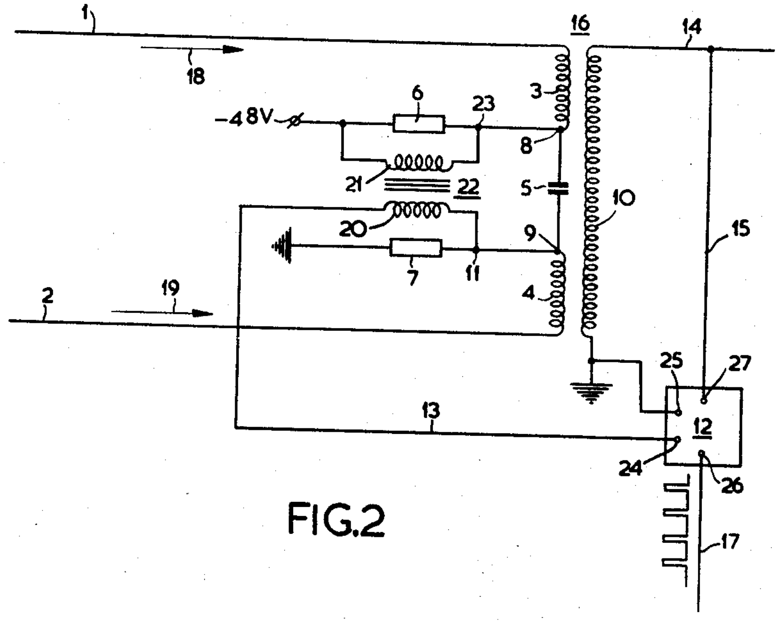
FIG. 2 shows a subscriber circuit of the kind shown in FIG. 1 to which the invention is applied.

FIG. 2 shows a manner in which the aforesaid disadvantage can be avoided in accordance with the invention. The difference with respect to the arrangement shown in FIG. 1 consists in that the detection point 11 is connected not directly, but via a first winding 20 of a transformer 22 to the input terminal of the gate circuit 12. A second winding 21 of the transformer is connected in parallel with the resistor 6. The resistances of the resistors 6 and 7, and the directions of winding and numbers of turns of the two windings 20 and 21 of the transformer 22 are chosen to be such that the currents produced by a longitudinal interference in the subscriber lines across the windings 20 and 21 induce, together, such a high magnetic field in the core of the transformer 22 that the variation produced by this interference in the potential supplied to the control-terminal of the gate circuit 12 is substantially compensated. By this measure, consequently, no erroneous signal can be applied to the gate circuit 12 owing to longitudinal interferences in the subscriber lines. In the arrangement shown in FIG. 2 use is also made of the possibility referred to above to connect the conductor 15 to the conductor 14. The inductance of the windings of the transformer 22 may be chosen such that the aforesaid disadvantage of an excessive delay in the signalizing of the state of the subscriber circuit does not occur.

Figure 3:
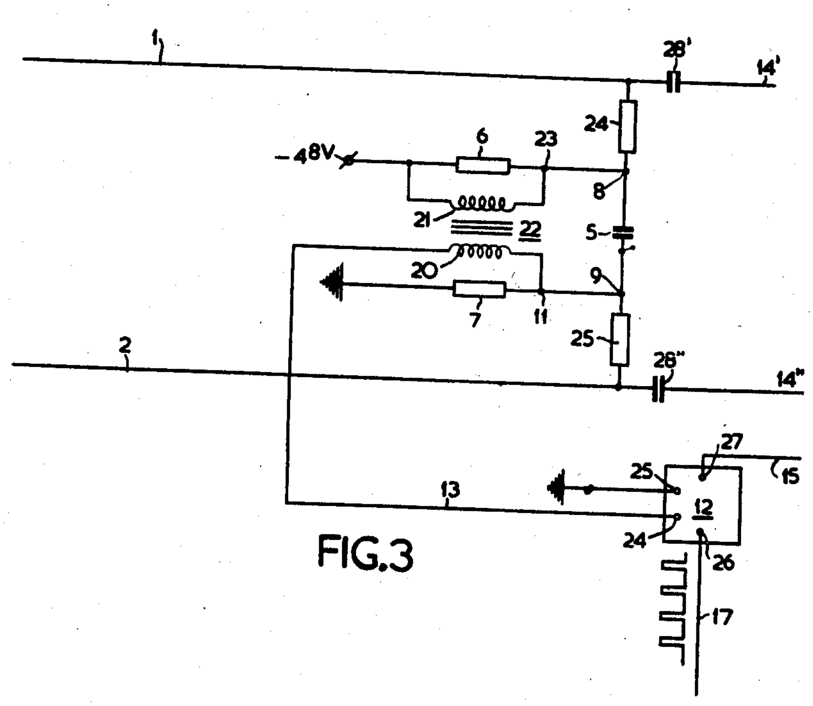
FIG. 3 shows a subscriber circuit with capacitative transmission, to which the invention is applied.

FIG. 3 shows a subscriber's line circuit which differs from that shown in FIG. 2 in that the transformer 16 is replaced by a capacitative coupling 24, 5, 25, 28′, 1, 28″.

What is claimed is:

1. In a transmission circuit for the transmission of information from a first current circuit having two electrically symmetrical halves to a second current circuit, wherein the first current circuit has a first point connected to a direct current source, a second point connected to ground, and a third point having a voltage dependent upon the open or closed state of the first current circuit, means for determining the state of said first current circuit substantially independently of longitudinal interference in said first current circuit comprising potential detecting means, a fourth point on said first current circuit symmetrical with said third point, and a transformer having a first winding connected between said third point and said detecting means and a second winding connected between said fourth point and ground, said windings being relatively arranged so that current in said second winding due to longitudinal interference induces a voltage in said first winding substantially compensating for the effect of longitudinal interference currents in said first winding.

2. A transmission circuit comprising first and second conductors, first and second symmetrical coupling means for transferring information from said first and second conductors to another circuit, said first and second coupling means having first terminals connected to said first and second conductors respectively, and second terminals joined together by capacitor means, first and second resistance means having one end connected to the second terminals of said first and second coupling means respectively, and their other ends connected to a source of direct potential and ground respectively, potential detecting means, a transformer having a first winding connected between said detecting means and one of said second terminals, and a second winding connected between the other of said second terminals and the other end of said resistance means connected to said other second terminal, whereby the effect of longitudinal interference in said conductors upon said detecting means is canceled.

3. A transmission circuit comprising first and second conductors, a first transformer having first and second symmetrical windings, one end of each of said first and second windings being connected to said first and second conductors respectively, capacitor means connecting the other ends of said first and second windings, a third winding on said transformer and coupled to another circuit, first and second impedance means connected between the other ends of said first and second windings respectively and a source of direct potential and ground respectively, potential detecting means, and a second transformer having a fourth winding connected between said detecting means and the other end of one of said symmetrical windings, and a fifth winding connected between the other end of the other of said symmetrical windings and ground.

References Cited in the file of this patent

UNITED STATES PATENTS

| | | |
|---|---|---|
| 2,676,210 | Oberman et al. | Apr. 20, 1954 |

FOREIGN PATENTS

| | | |
|---|---|---|
| 142,278 | Sweden | Sept. 29, 1953 |